(12) United States Patent
Herra-Vega et al.

(10) Patent No.: US 11,387,999 B2
(45) Date of Patent: Jul. 12, 2022

(54) ACCESS TO SECURED INFORMATION

(71) Applicant: WorkJam Inc., Montreal (CA)

(72) Inventors: Florencia Herra-Vega, Montreal (CA); Vincent Drouin, Montreal (CA)

(73) Assignee: WORKJAM INC., Montreal (CA)

( * ) Notice: Subject to any disclaimer, the term of this patent is extended or adjusted under 35 U.S.C. 154(b) by 0 days.

(21) Appl. No.: 16/652,340

(22) PCT Filed: Oct. 1, 2018

(86) PCT No.: PCT/CA2018/051232
§ 371 (c)(1),
(2) Date: Mar. 30, 2020

(87) PCT Pub. No.: WO2019/061001
PCT Pub. Date: Apr. 4, 2019

(65) Prior Publication Data
US 2020/0235925 A1    Jul. 23, 2020

Related U.S. Application Data

(60) Provisional application No. 62/565,579, filed on Sep. 29, 2017.

(51) Int. Cl.
*H04L 29/06* (2006.01)
*H04L 9/08* (2006.01)
(Continued)

(52) U.S. Cl.
CPC .......... *H04L 9/0894* (2013.01); *H04L 9/0869* (2013.01); *H04L 9/14* (2013.01); *H04L 9/3218* (2013.01)

(58) Field of Classification Search
CPC ....... H04L 9/0894; H04L 9/0869; H04L 9/14; H04L 9/3218; H04L 9/085; H04L 9/0861; H04L 9/321; H04L 63/061; G06F 21/602
See application file for complete search history.

(56) References Cited

U.S. PATENT DOCUMENTS 6,901,512 B2   5/2005  Kurn et al.
2002/0073309 A1*  6/2002  Kurn .................... H04L 9/14
                                                    713/155
(Continued)

FOREIGN PATENT DOCUMENTS

WO    WO 2016/077121 A1    5/2016

OTHER PUBLICATIONS

Metthal, "Feige-Fiat-Shamir identification scheme", Wikipedia (Apr. 3, 2017).
(Continued)

*Primary Examiner* — Yogesh Paliwal
(74) *Attorney, Agent, or Firm* — Benoit Yelle; Gowling WLG (Canada) LLP

(57) ABSTRACT

Exemplary implementations may: at one of the user devices, generate a master key; at one of the user devices, generate a basic key; at one of the user devices, generate a basic recovery key; at one of the user devices, perform a Shamir-type operation for obtaining n parts where m or more parts are necessary to recover (or compute a copy of) the master key; at one of the user devices, encrypt, using the basic key, the basic portion of a database for the user, the database being remote from the user devices; and at one of the user devices, encrypt, using the basic recovery key, the master key for storage into the recovery portion of the database, the database being remote from the user devices and the basic portion of the database being uncompromised by recovery of the basic recovery key.

24 Claims, 6 Drawing Sheets

(51) Int. Cl.
  *H04L 9/14*   (2006.01)
  *H04L 9/32*   (2006.01)

(56) References Cited

U.S. PATENT DOCUMENTS

| | | | |
|---|---|---|---|
| 2007/0297610 A1 | 12/2007 | Chen et al. | |
| 2012/0163592 A1* | 6/2012 | Bellare | H04L 9/14 |
| | | | 380/44 |
| 2018/0053442 A1* | 2/2018 | Ikarashi | G09C 1/00 |
| 2020/0389306 A1* | 12/2020 | Dolan | H04L 9/3066 |

OTHER PUBLICATIONS

Sushil, Jajodia et al., "Securing password recovery through dispersion", 2012 Fourth International Conference on Computational Aspects of Social Networks (Nov. 1, 2012) pp. 228-233.

International Preliminary Report on Patentability dated Mar. 31, 2020 for corresponding PCT/CA2018/051232.

Extended European Search Report dated Jun. 1, 2021 for corresponding EP application No. 18862157.7.

Lizziemcguire, "Shamir's Secret Sharing", Wikipedia (Sep. 15, 2017) pp. 1-6.

\* cited by examiner

ACCESS TO SECURED INFORMATION

CROSS REFERENCE TO RELATED APPLICATIONS

The present non-provisional patent application is a U.S. National Phase of International Patent Application PCT/CA2018/051232, filed Oct. 1, 2018, which is hereby incorporated by reference in its entirety and which claims priority based upon the prior U.S. provisional patent application, application No. 62/565,579, filed Sep. 29, 2017, which is incorporated herein by reference in its entirety.

TECHNICAL FIELD

The present invention relates to secured electronic communication and, more particularly, to secured end-to-end electronic communication in multi-party organizations.

BACKGROUND

End-to-end secured electronic communication is desired in many different contexts. Typically, inter-party trust and content privacy are the required features. As skilled persons will recognize, end-to-end secured electronic communication implies that only the correspondents of a secured message exchange should have access to the content of the exchange. Encryption and decryption, therefore, take place on the client-side and the secured message remains encrypted on all network nodes between the clients.

Different tools and platforms have been proposed that support end-to-end secured communication. Unfortunately, existing solutions remain selectively used only within closed communities. Specifically, it has been noticed that organizations do not tend to support deployment of end-to-end secured communication solutions. It is anticipated that adoption, especially in larger organizations, could be enhanced by the addition of one or more recovery mechanisms. However, deployment of a recovery mechanism may create the impression that the solution is not an end-to-end secured communication solution because, for instance, the communications could then be arbitrarily and/or privately accessed by parties that were not originally involved in the communication. The present invention aims at providing one or more technical enhancements that can be used to support one or more recovery mechanisms, in the context of end-to-end secured communication, while keeping in mind the ultimate trust and privacy objectives of end-to-end secured electronic communication.

It is worth noting, as skilled persons would readily acknowledge, that the secured communication problem exposed herein is the result of the use of computer-based encryption technologies. Likewise, a solution to the computer-based encryption problem inevitably relies on processing capabilities that only computing devices can provide.

SUMMARY

The summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A first aspect is directed to a computing platform enabling selective access to secured information, the computing platform comprising at least one user device comprising a non-transient computer-readable storage medium having executable instructions embodied thereon and one or more hardware processors. The one or more hardware processors are configured to execute the instructions to generate the master key, the master key forming at least a part of the secured information, generate a basic key, generate a basic recovery key, perform a Shamir-type operation for obtaining n parts, wherein m parts are required to recover the basic recovery key with m<n, distribute m or more of the n parts each to one party from a plurality of parties, encrypt, using the basic key, the basic portion of the database, the database being remote from the user devices and encrypt, using the basic recovery key, the master key for storage into the recovery portion of the database, the database being remote from the user devices and the basic portion of the database being uncompromised by recovery of the basic recovery key.

Optionally, the one or more hardware processors may be configured to execute the instructions, when distributing the m or more of the n parts each to one party from the plurality of parties, to distribute each of the m or more parts to one and only one party of the plurality of parties.

Optionally, the one or more hardware processors may be configured to execute the instructions, when performing the Shamir-type operation, to perform the Shamir-type operation on the basic recovery key itself.

Optionally, the computing platform may further comprise at least one server comprising a server-side non-transient computer-readable storage medium having executable instructions embodied thereon, the database for the user and one or more hardware processors. The one or more hardware processors may be configured by the instructions to, upon reception of m or more parts from m or more parties from the plurality of parties, compute a copy of the basic recovery key and decrypt, using the copy of the basic recovery key, the master key for the third party from the recovery portion of the database, wherein the basic portion of the database is uncompromised when the recovery portion of the database is decrypted.

The one or more hardware processors of the client deice may further be configured by the instructions to, prior to generating the basic recovery key, obtain a recovery string for the user, wherein generating the basic recovery key is performed from at least the recovery string using a deterministic process and wherein performing the Shamir-type operation involves performing the Shamir-type operation on the recovery string.

The computing platform may further comprise at least one server comprising a server-side non-transient computer-readable storage medium having executable instructions embodied thereon, the database for the user and one or more hardware processors. The one or more hardware processors may be configured by the instructions to, upon reception of m or more parts from m or more of the plurality of parties, compute a copy of the recovery string, from the copy of the recovery string, generate a copy of the basic recovery key from at least the copy of the recovery string using the deterministic process and decrypt, using the copy of the basic recovery key, the master key from the recovery portion of the database, wherein the basic portion of the database is uncompromised when the recovery portion of the database is decrypted.

Optionally, the master key may be a content key for gaining access to a message content from a secured communication. In such an example, the content key may be provided to a third party member of an organization that was not an original correspondent to the secured communication. The computing platform may further comprise at least one server comprising a server-side non-transient computer-readable storage medium having executable instructions embodied thereon, the database for the user and one or more hardware processors. The one or more hardware processors may be configured by the instructions to assign a username to the user, the username being unique within a domain of users for the organization comprising the user. The one or more hardware processors may be configured by the instructions to create the database for the user, the database further comprising a secured content portion. The one or more hardware processors may yet also be configured by the instructions to, upon reception of m or more parts from m or more parties from the plurality of parties, compute a copy of the basic recovery key for recovering content stored encrypted in the secured content portion of the database before decrypting, using the copy of the basic recovery key, the content for the third party from the recovery portion of the database. As can be appreciated, the basic portion of the database is uncompromised when the recovery portion of the database is decrypted. The one or more hardware processors may also be configured by the instructions to decrypt the content from the secured portion of the database and provide the decrypted message content in the organization. Generating the basic key may be performed, at the user device, from at least the secret string and the username and generating the master key may be performed, at the user device, by generating the content key from a random number, the user devices further storing content encrypted using the content key into the secured content portion of the database.

A second aspect is directed to a method, the method comprising, at one of the user devices: generating the master key; generating a basic key; generating a basic recovery key; performing a Shamir-type operation for obtaining n parts, wherein m parts are required to recover the basic recovery key with m n; distributing m or more of the n parts each to one party from a plurality of parties; encrypting, using the basic key the basic portion of the database, the database being remote from the user devices; and encrypting, using the basic recovery key the master key for storage into the recovery portion of the database, the database being remote from the user devices and the basic portion of the database being uncompromised by recovery of the basic recovery key.

Optionally, distributing the m or more of the n parts each to one party from the plurality of parties is performed by distributing each of the m or more parts to one and only one party of the plurality of parties.

Optionally, performing the Shamir-type operation involves performing the Shamir-type operation on the basic recovery key itself.

The method may optionally further comprise, upon reception of m or more parts from m or more parties from the plurality of parties, computing a copy of the basic recovery key at the computer controlled by the third party and decrypting, using the copy of the basic recovery key, the master key for the third party from the recovery portion of the database, wherein the basic portion of the database is uncompromised when the recovery portion of the database is decrypted.

The method may optionally further comprise, prior to generating the basic recovery key, obtaining a recovery string for the user, wherein generating the basic recovery key is performed from at least the recovery string using a deterministic process and wherein performing the Shamir-type operation involves performing the Shamir-type operation on the recovery string.

The method may then further optionally comprise, upon reception of m or more parts from m or more of the plurality of parties, computing a copy of the recovery string at a computer controlled by the third party; from the copy of the recovery string, generating a copy of the basic recovery key at the computer controlled by the third party from at least the copy of the recovery string using the deterministic process; and decrypting, using the copy of the basic recovery key, the master key for the third party from the recovery portion of the database, wherein the basic portion of the database is uncompromised when the recovery portion of the database is decrypted.

Optionally, the master key may be a content key for gaining access to a message content from a secured communication, wherein the content key is provided to the third party member of an organization that was not an original correspondent to the secured communication, and the method may then further comprise, at a server of the organization, assigning a username to the user, the username being unique within a domain of users for the organization comprising the user; at the server of the organization, creating the database for the user, the database further comprising a secured content portion; obtaining a secret string associated to the user, wherein generating the basic key is performed, at one of the user devices, from at least the secret string and the username and wherein generating the master key is performed, at one of the user devices, by generating the content key from a random number; from one of the user devices, storing content encrypted using the content key into the secured content portion of the database; upon reception of m or more parts from m or more parties from the plurality of parties, computing a copy of the basic recovery key at the server of the organization for recovering content stored encrypted in the secured content portion of the database; decrypting, using the copy of the basic recovery key the content for the third party from the recovery portion of the database, wherein the basic portion of the database is uncompromised when the recovery portion of the database is decrypted; and at the server of the organization, decrypting the content from the secured portion of the database and providing the decrypted message content in the organization.

A third aspect is directed to a system comprising a user device comprising one or more hardware processors configured by machine-readable instructions to: generate the master key; generate a basic key; generate a basic recovery key; perform a Shamir-type operation for obtaining n parts, wherein m parts are required to recover the basic recovery key with m n; from one of the user devices, distributing m or more of the n parts each to one party from a plurality of parties; encrypt, using the basic key the basic portion of the database, the database being remote from the user devices; and encrypt, using the basic recovery key the master key for storage into the recovery portion of the database, the database being remote from the user devices and the basic portion of the database being uncompromised by recovery of the basic recovery key.

Distributing the m or more of the n parts each to one party from the plurality of parties may optionally be performed by distributing each of the m or more parts to one and only one party of the plurality of parties.

Performing the Shamir-type operation may optionally involve performing the Shamir-type operation on the basic recovery key itself.

The system may further comprise a server configured by machine-readable instructions to, upon reception of m or more parts from m or more parties from the plurality of parties, compute a copy of the basic recovery key at the computer controlled by the third party; decrypt, using the copy of the basic recovery key, the master key for the third party from the recovery portion of the database, wherein the basic portion of the database is uncompromised when the recovery portion of the database is decrypted.

The one or more hardware processors of the client device may further be configured by machine-readable instructions to, prior to generating the basic recovery key, obtain a recovery string for the user; wherein generating the basic recovery key is performed from at least the recovery string using a deterministic process; and wherein performing the Shamir-type operation involves performing the Shamir-type operation on the recovery string. In such an example, the system may then further comprising a server configured by machine-readable instructions to, upon reception of m or more parts from m or more of the plurality of parties, compute a copy of the recovery string at a computer controlled by the third party, from the copy of the recovery string, generating a copy of the basic recovery key at the computer controlled by the third party from at least the copy of the recovery string using the deterministic process; and decrypt, using the copy of the basic recovery key, the master key for the third party from the recovery portion of the database, wherein the basic portion of the database is uncompromised when the recovery portion of the database is decrypted.

Optionally the master key may be a content key for gaining access to a message content from a secured communication, wherein the content key is provided to a third party member of an organization that was not an original correspondent to the secured communication; wherein the system further comprise a server configured by machine-readable instructions to assign a username to the user, the username being unique within a domain of users for the organization comprising the user; create the database for the user, the database further comprising a secured content portion; upon reception of m or more parts from m or more parties from the plurality of parties, compute a copy of the basic recovery key at the server of the organization for recovering content stored encrypted in the secured content portion of the database; decrypt, using the copy of the basic recovery key the content for the third party from the recovery portion of the database, wherein the basic portion of the database is uncompromised when the recovery portion of the database is decrypted; and decrypt the content from the secured portion of the database and provide the decrypted message content in the organization. obtain a secret string associated to the user. In such an example, generating the basic key is performed from at least the secret string and the username and wherein generating the master key is performed by generating the content key from a random number, the user device further storing content encrypted using the content key into the secured content portion of the database.

A fourth aspect is directed to a non-transient computer-readable storage medium having instructions embodied thereon, the instructions being executable by one or more processors to perform a method, the method comprising, at one of the user devices: generating the master key; generating a basic key; generating a basic recovery key; performing a Shamir-type operation for obtaining n parts, wherein m parts are required to recover the basic recovery key with m n; distributing m or more of the n parts each to one party from a plurality of parties; encrypting, using the basic key the basic portion of the database, the database being remote from the user devices; and encrypting, using the basic recovery key the master key for storage into the recovery portion of the database, the database being remote from the user devices and the basic portion of the database being uncompromised by recovery of the basic recovery key.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

Further features and exemplary advantages of the present invention will become apparent from the following detailed description, taken in conjunction with the appended drawings, in which.

DETAILED DESCRIPTION

In a general broad sense, the present invention provides different building blocks that can be used in order to enable a selective recovery mechanism for secured information (e.g., encryption key, encrypted content, etc.). For instance, the selective recovery mechanism may be applied in the context of end-to-end secured electronic communication. As skilled persons will recognize, end-to-end secured electronic communication implies that only the correspondents of a secured message exchange should have access to the content of the exchange. Encryption and decryption, therefore, take place on the client-side and the secured message remains encrypted on all network nodes between the clients. The end-to-end feature also means that servers and routers between the correspondents need to be able to route the secured message without getting access to its content, which requires some of the metadata to be provided in accordance with legacy systems.

As previously discussed, deployment of end-to-end secured communication in organizations is predicted to be more accessible if it is possible for the organization to selectively retrieve the content of secured end-to-end communications. One or more events may lead an organization to consider that the content is required. Likewise, more generally, different kinds of secured information may need to be retrieved by a third party even though they were never meant to be (e.g., authentication information to a secured account for a deceased person or incapacitated person and/or upon judgment by a recognized court, etc.). The solution proposed herein does not set the policies that determine how and when the secured content is to be retrieved, but supports retrieval when a decision is reached by a threshold number of instances (e.g., a threshold number of people in an organization or reference group/group of confidence). The solution proposed suggests and supports that the policies adopted (e.g., within an organization) be shared to ensure that the users are able to acknowledge and appreciate the limitations imposed on the secured content (e.g., the end-to-end secured communications).

Figure 1:
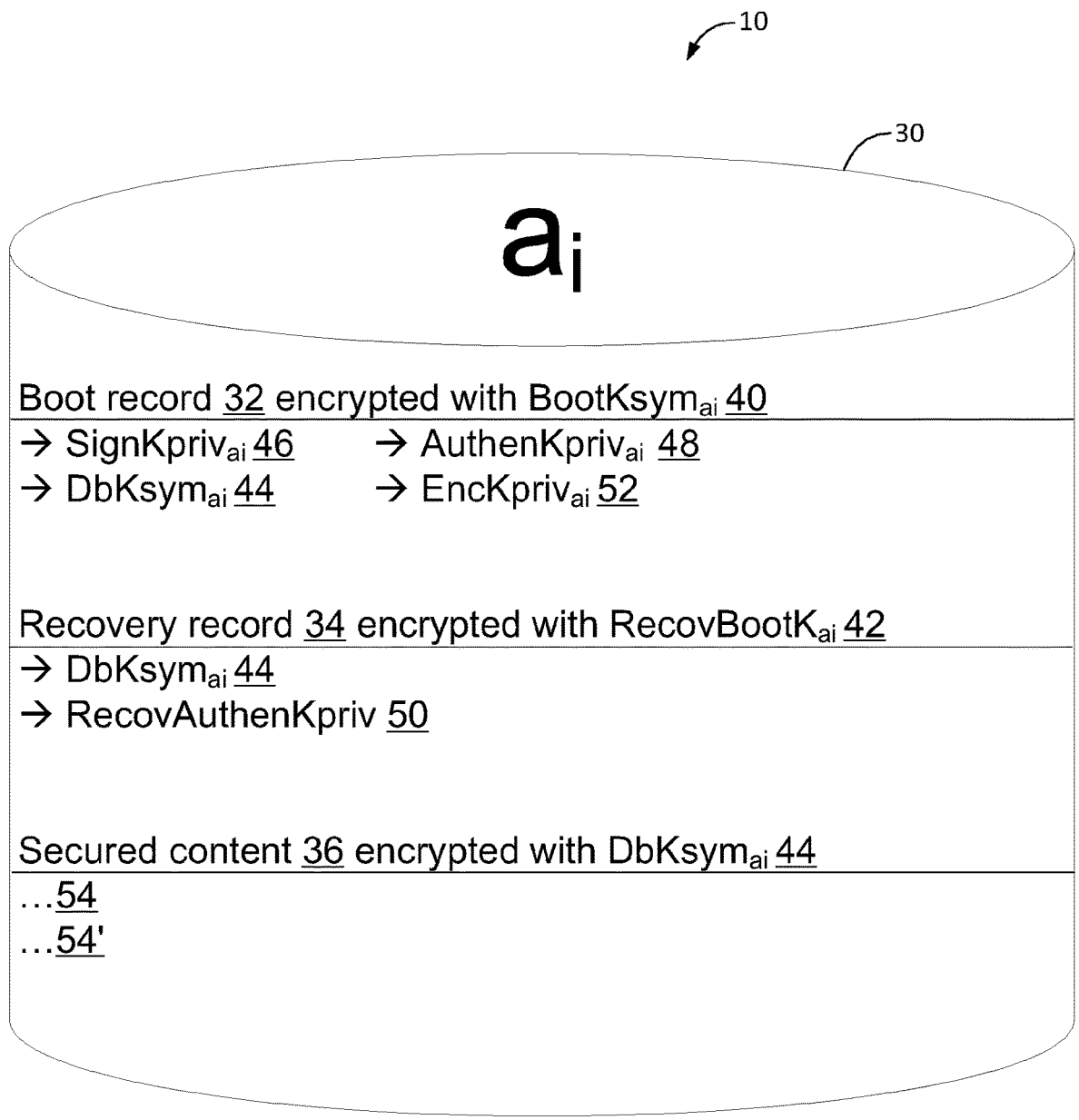
FIG. 1 is a logical representation of a system comprising a database in accordance with the teachings of the present invention.

Reference is now made to the drawings and more specifically to the example depicted on FIG. 1. In an exemplary embodiment depicted therein and discussed hereinafter, it is taken for granted that a secured content policy has been defined (e.g., an organization has defined a secured end-to-end communication policy). In the discussed embodiment, the secured content policy defines a group X of "super users" controlling, as a group, an overriding authority capability, with=$\{x_1 \ldots _n | n \in \mathbb{N} \}$. Each super user $x_i \in X$ does not necessarily possess technical skills and/or does not necessarily dedicate time to technical questions. In the discussed embodiment, the secured content policy also defines a number $m \in \mathbb{N}$, $m < n$ from the group X of supers users that need to agree before the overriding authority is activated. The overriding authority enables secured content to be made available to someone else than the originally involved end user(s). In order to reach this desired result, a key-management infrastructure that is robust and reliable, yet selectively allows approved-exceptions, is proposed hereinafter.

The organization or instance has a number k of end users $A=\{a_1 \ldots _k | k \in \mathbb{N}, k < \infty\}$, each member $a_i \in A$ has at least one client device 20 associated therewith. The number of end users k is presumed to be large (e.g., >100), but skilled persons will recognize how to adapt the solution to different contexts. A set of functions BKgen embodying key-management algorithms is provided to each client device 20 in the system 10 to obtain a set of keys $Keys_{ai}$ for $a_i$. As can be appreciated from the definition below, the set of keys $Keys_{ai}$ are user-specific and not device-specific.

The solution relies on critical elements being made available only to the right persons in the right context. Specifically, in one embodiment, each user of the system 10 has a secret string used during the key generation process on each of the device 20 on which the solution is to be deployed. The secret string might be a passphrase, a password, any kind of characters string (e.g., from a specific character set) or even any secret data, as long as only the user knows the secret string. It is defined as a secret "string" for easier reference, as it is expected to be the most accessible embodiment, but the invention is not limited thereby. While not mandatory, it is suggested that the secret string be subjected to minimal complexity and length requirements (e.g., in the secured end-to-end communication policy), which would complicate brute force attacks, as will become apparent hereinbelow. The secret string might be provided by the user but may also be provided to the user (and only the user) by a generation algorithm preferably running on a local device 20 controlled by the user or on a server (not shown) that is not controlled by the organization or instance or at least not controlled through the key-management infrastructure (e.g., of the organization). A recovery string is also defined and made available to the user during the key generation process. The recovery string is also chunked before being shared amongst the group X of super users, as will be further defined hereinbelow. Typically, but not necessarily, the recovery string would be subjected to similar limitations as the secret string.

In one embodiment, upon activation of user $a_i$, a username $username_{ai}$ is assigned thereto and a secret string $secretSt_{ai}$ is selected by $a_i$, or otherwise made available thereto in a secured manner (e.g., by the server 102). In some embodiments, the value of $secretSt_{ai}$ may be expected to be remembered by user $a_i$ without the need to be written or otherwise exposed or compromised. In other embodiments, $secretSt_{ai}$ may also or alternatively be stored in a secured local cache on the client device 20 (e.g., Trusted Platform module (TPM) solution (not shown), . . . ). All keys from a set of keys $Keys_{ai}$ are then locally generated on the $a_i$ client device 20, as detailed below, and not shared with the server 102. It is important to emphasize the local generation of the keys, which ensures continued privacy and trust for the solution. Specifically, $Keys_{ai}$ in the present example comprises a pair of asymmetrical authentication keys {AuthenKpriv, AuthenKpub}$_{ai}$, which is used by the $a_i$ client device 20 to authenticate itself with a remote server 102 (an example of an applicable procedure being described hereinbelow). A database for $a_i$ 30 is created or otherwise made accessible on the server 102 following authentication. The database for $a_i$ 30 comprises, or is otherwise ready to receive, a boot record 32, a recovery record 34 and a secured content record 36. The $a_i$ client device 20 uses a basic symmetric key BootKsym$_{ai}$ 40 from Keys$_{ai}$ to encrypt the boot record 32 in the remote database 30 created for ai. Likewise, the $a_i$ client device 20 uses a basic symmetric recovery key RecovBootK$_{ai}$ 42 from Keys$_{ai}$ to encrypt the recovery record 34 in the remote database 30 created for $a_i$. A symmetrical secured content database key DbKsym$_{ai}$ 44 from Keys$_{ai}$ is used by the $a_i$ client device 20 to encrypt, in the remote database 30 created for ai, the secured content record 36. The boot record 32 at least stores, in encrypted form, DbKsym$_{ai}$ 44 and a private signature key SignKpriv$_{ai}$ 46 from a pair of asymmetrical signature keys from Keys$_{ai}$, which that also comprises SignKpub$_{ai}$. The pair of signature keys may be used, for instance, to cryptographically sign all pieces of information (e.g., messages and optionally some metadata, documents, oath, etc.) produced within the system using SignKpriv$_{ai}$ 46. In such an embodiment, the system 10 would be able to flag any incorrectly signed information (relying on SignKpub$_{ai}$). The recovery record stores, in encrypted form, DbKsym$_{ai}$ 44.

In the present example, the set of keys Keys$_{ai}$ comprises the basic symmetric key BootKsym$_{ai}$ 40, the pair of asymmetric signature keys {SignKpriv 46, SignKpub}$_{ai}$, the pair of asymmetric authentication keys {AuthenKpriv 48, AuthenKpub}$_{ai}$, the symmetric database encryption key DbKsym$_{ai}$ 44 and the recovery basic key RecovBootK$_{ai}$ 42. Additional keys related to encryption and/or shared encryption would also typically be part of the set of keys Keys$_{ai}$, even though they may not be required in all embodiments. In the example discussed in the following lines, the set of keys Keys$_{ai}$ also comprises a pair of recovery asymmetric authentication keys {RecovAuthenKpriv 50, RecovAuthenKpub}$_{ai}$ (e.g., used for on-behalf authentication into the server for $a_i$), and a pair of asymmetric keys for shared encryption {SharedKpriv, SharedKpub}$_{ai}$.

Mathematical definitions of the set of functions BKgen and how they relate to the different components of the set of keys Keys$_{ai}$ are provided hereinbelow:
BKgen={BasicB&A( ), AuthenKgen( ), SignKgen( ), DbKgen( ), RecovB&A( ), RecovAuthenKgen( ), SharedK( )}; and $Keys_{ai} = BB\&A_{ai} \cup SignK_{ai} \cup DbK_{ai} \cup RB\&A_{ai} \cup SharedK_{ai}$
where:
1. $BasicB\&A(secretSt_{ai}, username_{ai}, AuthSalt_{ai}) \xrightarrow{yields} BB\&A_{ai} = \{BootKsym, AuthenKpriv\}_{ai} \cup AuthenKgen( ) \xrightarrow{yields} \{AuthenKpub\}_{ai}$ with:
   a. $BB\&A_{ai}$ that provides a predetermined number of bits from which $BootKsym_{ai}$ and $AuthenKpriv_{ai}$ are selected;
   b. $AuthenKgen(AuthenKpriv_{ai}) \xrightarrow{yields} AuthenKpub_{ai}$;
   c. $secretSt_{ai}$ is sufficiently robust and known by $a_i$, re-entered on every device;
   d. $username_{ai}$ is unique and attributed to $a_i$; and
   e. $AuthSalt_{ai}$ is available at the time of generation and repeatable for $a_i$; improves non-deterministic nature of the generated keys.
2. $SignKgen(SI) \xrightarrow{yields} SignK_{ai} = \{SignKpriv, SignKpub\}_{ai}$ with:
   a. SI as a one-time variable randomly generated input.
3. $DbKgen(DB) \xrightarrow{yields} DbK_{ai} = \{DbKsym\}_{ai}$ with:
   a. DB as a one-time variable randomly generated input.
4. $RecovB\&A(recovSt_{ai}, username_{ai}, RecovAuthSalt_{ai}) \xrightarrow{yields} RB\&A_{ai} = \{RecovBootK, RecovAuthenKpriv\} \cup RecovAuthenKgen( ) \xrightarrow{yields} \{RecovAuthenKpub\}_{ai}$ with:
   a. $RecovAuthenKgen(RecovAuthenKpriv_{ai}) \xrightarrow{yields} RecovAuthenKpub_{ai}$;
   b. $recovSt_{ai}$ is known by $a_i$ only upon generation, before being shared;
   c. $username_{ai}$ is the same as above; and
   d. $RecovAuthSalt_{ai}$ is available at the time of generation and repeatable for ai; improves non-deterministic nature of the generated keys.
5. $SharedEncK(SH) \xrightarrow{yields} SharedK_{ai} = \{SharedKpriv, SharedKpub\}_{ai}$ with:
   a. SH as a one-time variable randomly generated input; and yields
   b. $SharedKgen(SharedKpriv_{ai}) \xrightarrow{yields} SharedKpub_{ai}$.

When $a_i$ is activated in the system 10, the $recovSt_{ai}$ is split, using Shamir's secret-sharing scheme or an equivalent means, into a set of secrets parts $S_{ai} = \{s_{1...n}\}$ such that any subset $P_{ai} = \{p_{1...m}\} \subseteq S_{ai}$ allows reconstruction of the $recovSt_{ai}$. Each $s_i$ part of $S_{ai}$ is made available to one member of $x_i \in X$ (i.e., to one of the super users).

When an exception is to be approved, each of the super users is asked whether it makes sense, strategically for the organization or instance, to approve the exception. The exception is approved (e.g., by an organization) when m or more of the super users agree. Upon approval, at least m of the corresponding m or more parts from $S_{ai}$ are provided to a single computing node. Technically, approval of the exception causes rebuilding of $recovSt_{ai}$ from m parts thereof at the computing node. Once $recovSt_{ai}$ is obtained, RecovB&A( ) allows for rebuilding of the $RecovBootK_{ai}$ 42, which, in turn, allows to access the recovery boot record 34 from the database 30 created for $a_i$ and thereby provides access to $DbKsym_{ai}$ 44. With $DbKsym_{ai}$ 44, the content encrypted (54, 54') by $a_i$ is available, but the private signature key for $a_i$ (aka $SignKpriv_{ai}$ 46) is not available, which prevents $a_i$ from being impersonated. Other keys may be similarly protected in the boot record, such as a private encryption key 52 for $a_i$.

A layered architecture based on the same principle would be achievable for supporting one or multiple simpler exception approval procedures (e.g., password reset, periodic password update, password update following compromising risk, etc.). More specifically, a larger group of helpdesk administrators could be defined to handle these procedures where the user himself is required to be involved. For these updates, additional measures could be required to minimize fraudulent use of the procedure, such as: delay between the password reset request and the effective reset; 2-step reset (pin-generator or the like); phone call or physical presence verification requirements, etc. In some instances, a dedicated group of IT people could be determined to handle certain types of requests. The dedicated group could be fixed or its members could be constantly/randomly selected (e.g., to avoid creating identifiable weaker points).

Similarly to the recovery mode, a "leave" record (not shown) could be made available in a user's database, which may allow a third party (e.g., a designated colleague) to temporarily (e.g., during an expected or unexpected "extended" leave) to act on-behalf of the user, without impersonating the user (e.g., a leave key can be selectively retrieved, giving access to the $DbKsym_{ai}$ 44, but not to the boot record 32). Similarly, a "delegated" record (not shown) could be created for a delegate of the user to access the secured content (e.g., a delegate key can be selectively retrieved, giving access to the $DbKsym_{ai}$ 44, but not to the boot record 32).

The system 10 is robust to super users being removed from the original group, i.e., $X' = \{x_{1...(n-1)} | n \in \mathbb{N}\}$ as long as $n \geq m$. However, when m changes, when n increases or when n decreases too much (e.g., threshold could be set in the secured communication policy), every recovery string needs to be distributed de novo to the members of X (aka "re-Shamired"). The "re-Shamir" needs to be performed from the client device 20 and will therefore require the user to log thereinto before the update is completed and will also likely cause a delay upon login of the user. Replacement of a member of $x_a \in X$ could be performed by transferring the one or more secret parts possessed by $x_a$ to the new member $x_b \in X$. Of course, this inherently creates a weakness unless a mechanism exists to ensure that the secret parts held by $x_a$ were never compromised/copied (e.g., stored in a monitored secret repository).

Instead of performing the Shamir operation on a recovery string used to generate keys from a set of known algorithms, it would be possible to adapt the solution to directly perform one or more Shamir operations directly on the key(s), as further detailed hereinbelow. As skilled persons will know, the essential idea of Adi Shamir's threshold scheme is that 2 points are sufficient to define a line, 3 points are sufficient to define a parabola, 4 points to define a cubic curve and so forth. That is, it k points to define a polynomial of degree k-1. Suppose we want to use a (k,n) threshold scheme to share our secret S, without loss of generality assumed to be an element in a finite field F of size P where $0 < k \leq n < P$; $S < P$ and P is a prime number. Choose at random k-1 positive integers $a_1, \ldots, a_{k-1}$ with $a_i > P$. Build the polynomial $f(x) = a_0 + a_1 x + a_2 x^2 + \ldots + a_{k-1} x^{k-1}$. Let us construct any n points out of it, for instance set $i = 1, \ldots, n$ to retrieve (if(i)). Every participant is given a point (a non-zero integer input to the polynomial, and the corresponding integer output) along with the prime which defines the finite field to use. Given any subset of k of these pairs, we can find the coefficients of the polynomial using interpolation. The secret is the constant term $a_0$. Other operations leading to similar results could be used instead of the Shamir operation to lead to the same results.

Figure 2:
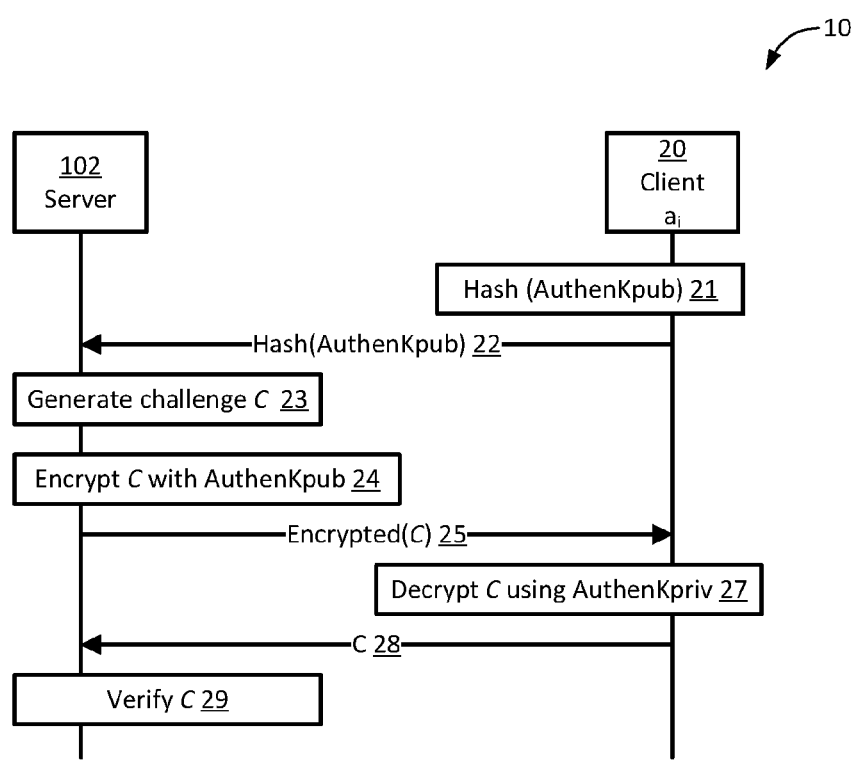
FIG. 2 is flow and nodal operational chart in accordance with the teachings of the present invention.

An exemplary authentication procedure performed between the remote server 102 and a client device 20 (e.g., for $a_i$) is depicted on FIG. 2. The exemplary authentication procedure is designed to ensure that $a_i$ is legitimately identified by the remote server 102 and also prevent illegitimate servers from replacing the remote server 102 (e.g., man-in-the middle attack). In the depicted example of FIG. 2, the client device 20 performs 21 a hash function on the key AuthenKpub and send 22 this value (i.e., Hash (AuthenKpub)) to the server 102. The server then generates 23 a challenge C (e.g., random or pseudo-random generation). The server 102 then encrypts 24 the challenge C with AuthenKpub. Sens 25 the encrypted challenge C to the device 20. The device 20 then decrypt 27 C using AuthenKpriv before sending 28 the challenge C back to the server 102 that can then verify 29 C.

Skilled persons will acknowledge that the present invention is not tied to keys of any fixed number of bits and could be adapted to various requirements, including different keys of different lengths for a single organization. Furthermore, examples of key derivation and encryption processes were provided herein, but skilled persons will understand how they may be varied without affecting the present invention (e.g., in the context of upcoming post-quantum cryptography advances). In each of the physical devices involved (e.g., client stations, handheld devices, servers, etc.), one or more processor modules, one or more memory modules, one or more storage devices and/or one or more network interface module are required to support the proposed solutions. Each of the processor module may represent a single processor with one or more processor cores or an array of processors, each comprising one or more processor cores. Specifically, the processor module may also comprise cryptography-dedicated processors optimized for the intensive cryptography related calculations. Each of the memory module may comprise various types of memory (different standardized or kinds of Random Access Memory (RAM) modules, memory cards, Read-Only Memory (ROM) modules, programmable ROM, etc.). Each of the storage devices module may represent one or more logical or physical as well as local or remote hard disk drive (HDD) (or an array thereof). The storage devices module may further represent a local or remote database made accessible to the physical device, e.g., by a standardized or proprietary interface. Each of the network interface module represents at least one physical interface that can be used to communicate with other network nodes. The network interface module may be made visible to the other modules of the physical device through one or more logical interfaces. The actual stacks of protocols used by the physical network interface(s) and/or logical network interface(s) of the network interface module do not affect the teachings of the present invention. The variants of processor module, memory module, network interface module and storage devices module usable in the context of the present invention will be readily apparent to persons skilled in the art. Likewise, even though explicit mentions of the memory module and/or the processor module are not made throughout the description of the present examples, persons skilled in the art will readily recognize that such modules are used in conjunction with other modules of the physical device to perform routine as well as innovative steps related to the present invention.

In the context of the depicted example of FIG. 1, the $DbKsym_{ai}$ 44 is a secured information that allows access to the secured content 36. In itself, getting access to the $DbKsym_{ai}$ 44 is a desirable outcome as it would be valuable even when the secured content 36 is empty as knowing that it is empty can only be ascertained once access to the $DbKsym_{ai}$ 44 (as a secured information) is obtained. In the example of FIG. 1, however, it is understood that the secured content 36 may also be of great value.

Figure 3:
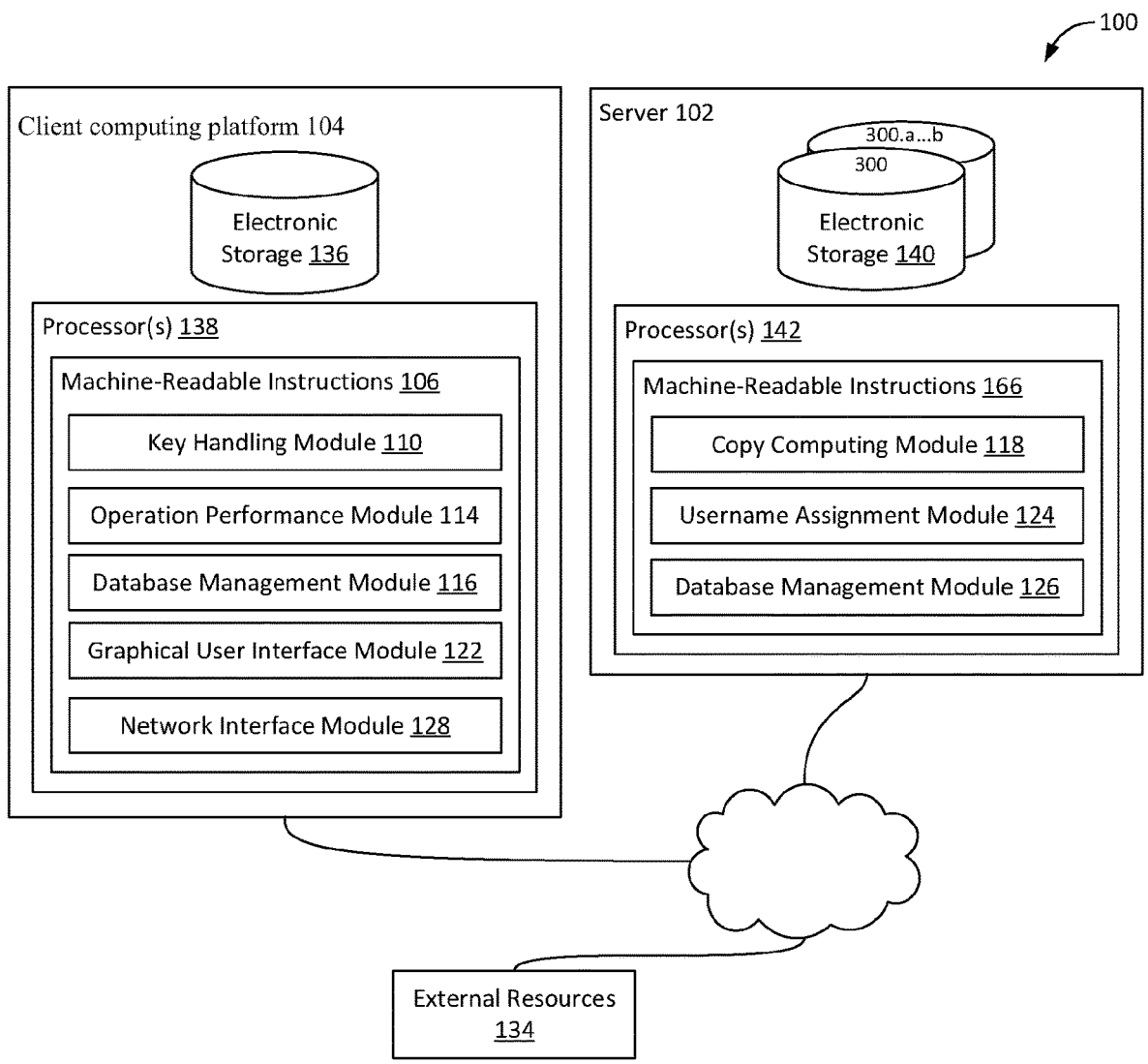
FIG. 3 is a modular representation of a system in accordance with the teachings of the present invention.
Figure 4:
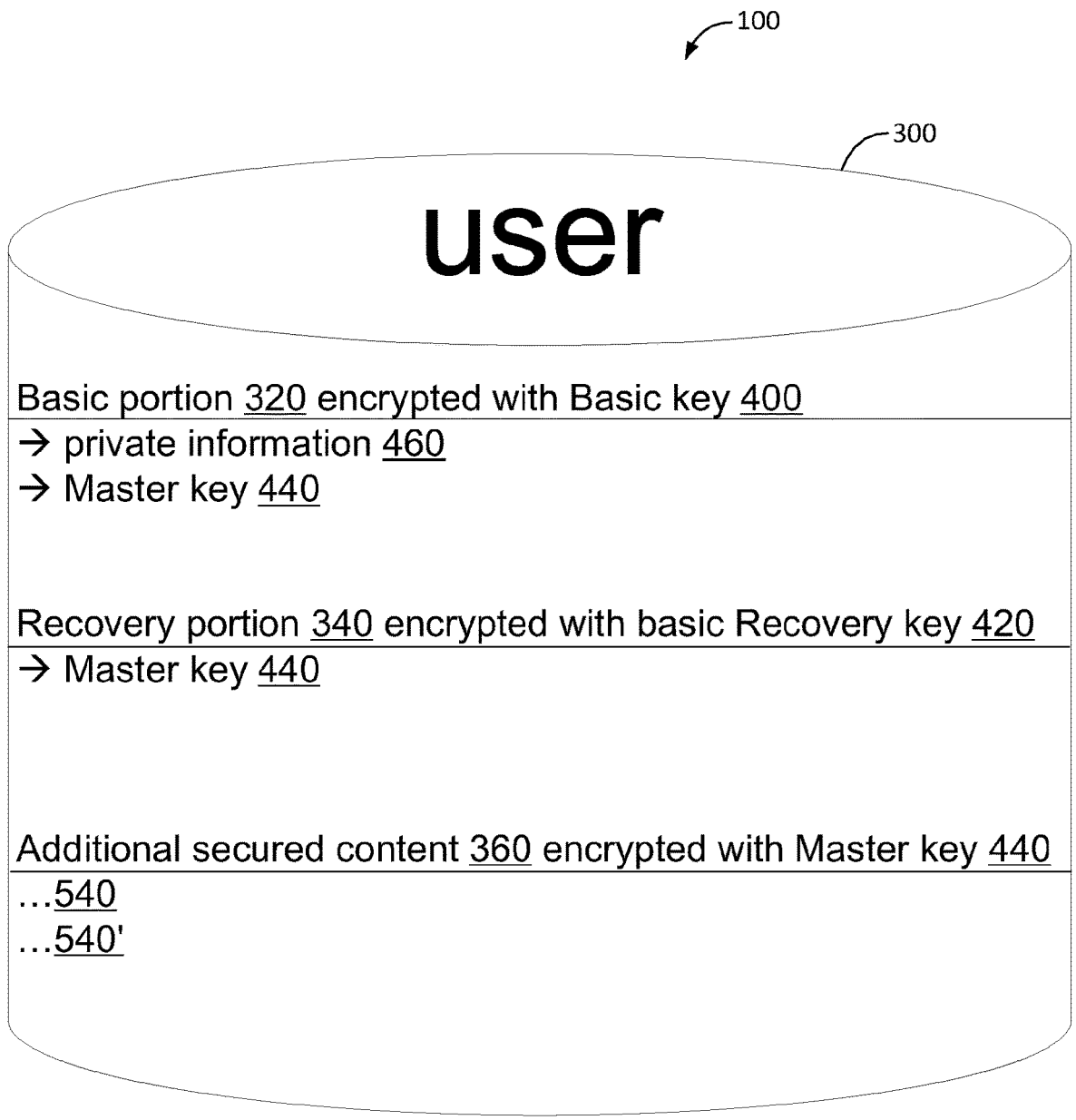
FIGS. 4 is a logical representation of a system comprising a database in accordance with the teachings of the present invention.
Figure 5:
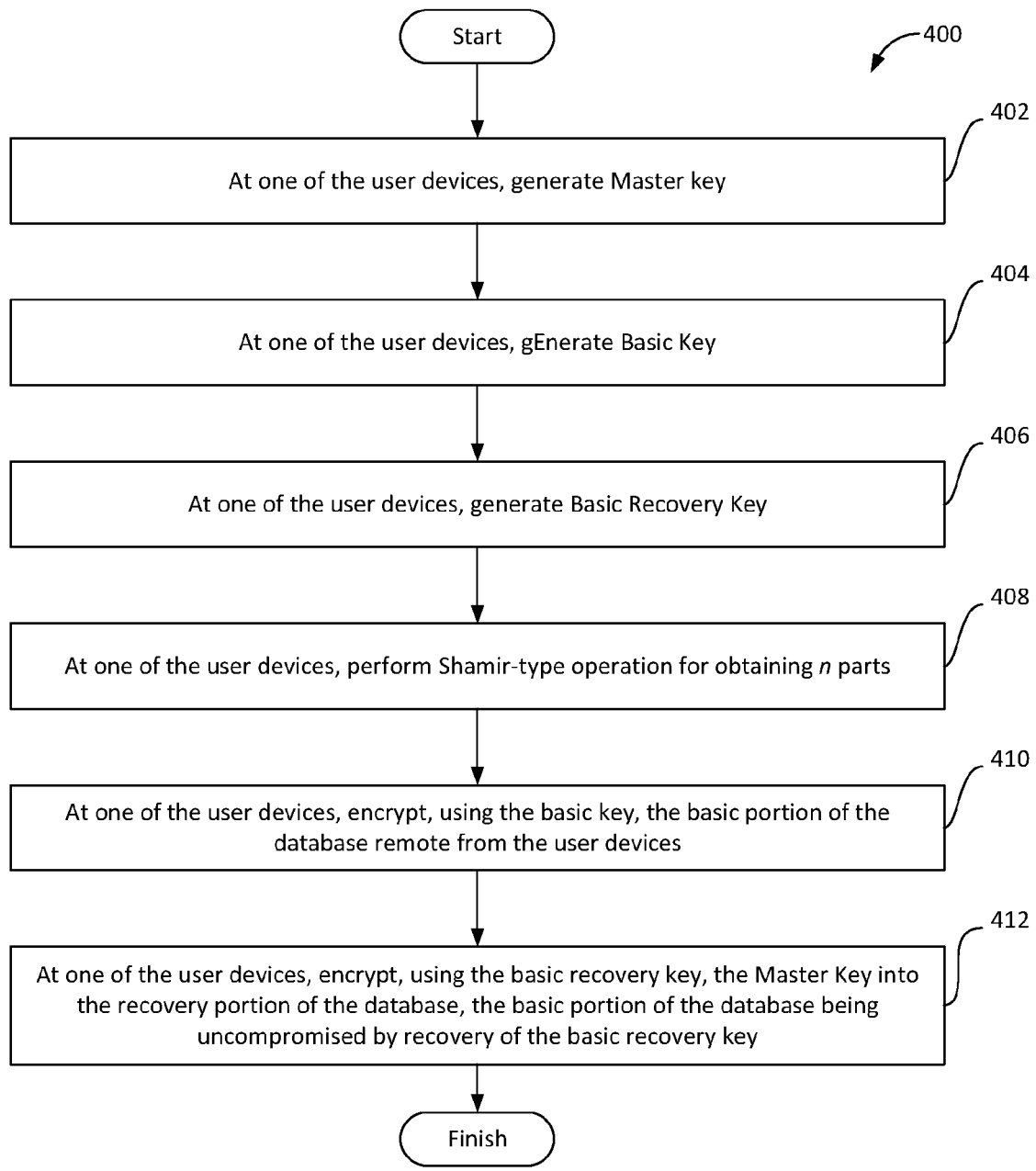
FIG. 5 is flow chart depicting a first method in accordance with the teachings of the present invention.
Figure 6:
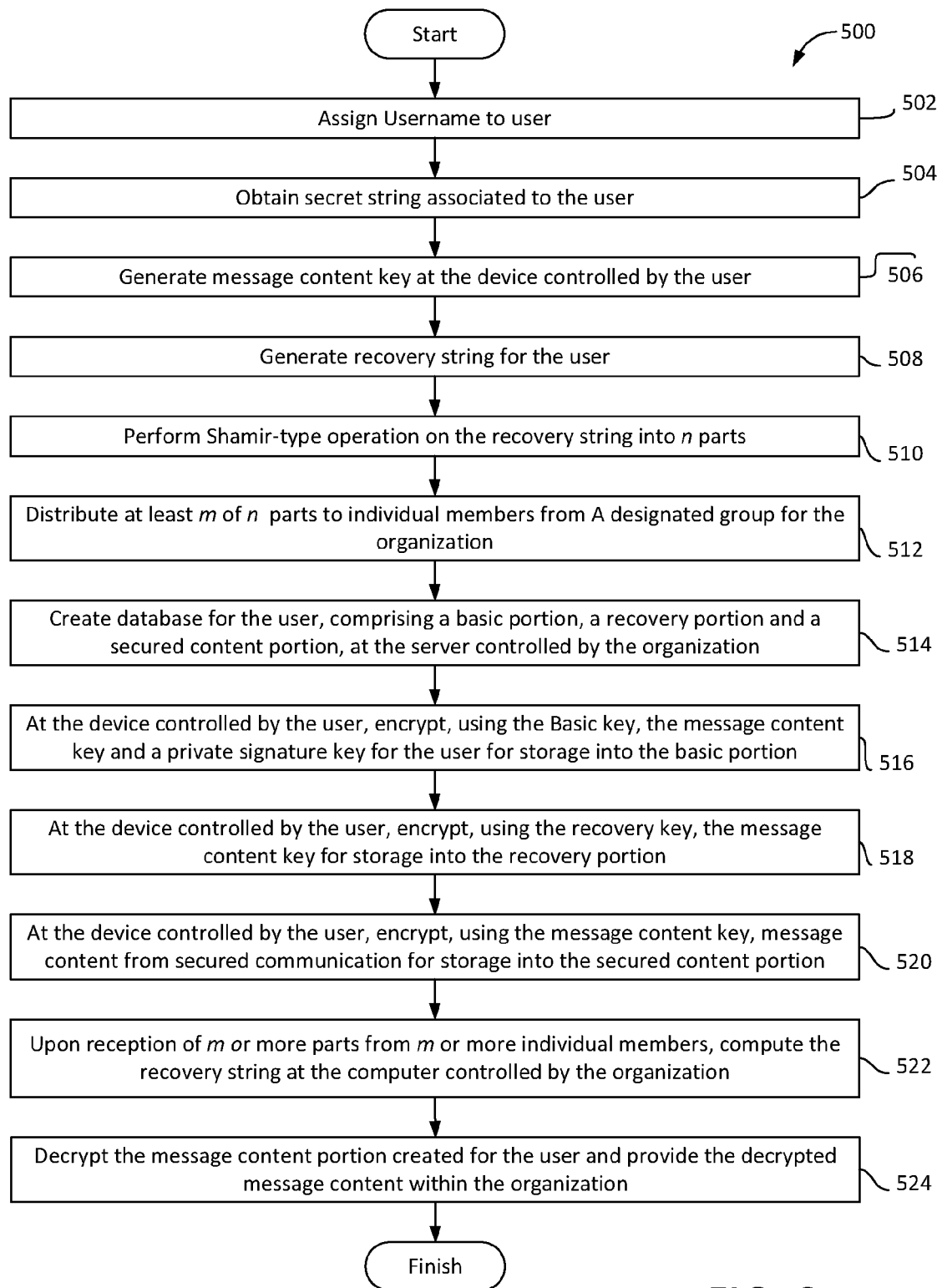
FIG. 6 is flow chart depicting a second method in accordance with the teachings of the present invention.

Reference is now concurrently made to FIG. 3 to FIG. 5 exemplifying a system 100, in accordance with one or more implementations. In the system 100, emphasis is made on getting access to a Master key 440 as a secured information from a database 300 for a given user. By comparison to the example of FIG. 1, getting access to additional secured content 360 is an optional feature in the system 100. In some implementations of the system 100, no additional secured content 360 may exist or other secure content (not shown) may be stored or otherwise located outside of the database (e.g., in external resources 134) and/or may be stored or otherwise located outside of the system 100. The Master key 440 may also represent a password or other information not used in the content of cryptography. For instance, the Master key 440 may take the form of a password or pass phrase (or any other type of credentials) that may be used to gain access to control of an account (financial information/account(s)). The Master key 440 could also be a cryptographic key to gain access to online of offline secured information (e.g., encrypted drive or the like). These represent only examples of the Master key 440 and skilled persons will readily be able to apply the teachings contained herein to other contexts.

The system 100 comprises one or more client computing platform(s) 104 and one or more servers 102. In the present context, the system would be used to manage a plurality of users. Yet, for the purpose of clarity and conciseness, features of the system 100 will be exemplified with reference to only one user. The user has control over one or more client devices in the system 100. In the following description, the client devices are also referred to as client computing platforms 104. The client computing platform 104 may be configured to communicate with other client computing platforms (not shown) via the server 102 and/or according to a peer-to-peer architecture and/or other architectures. Users are expected to access the system 100 via client computing platform 104. The server 102 is configured to communicate with one or more client computing platforms 104 according to a client/server architecture and/or other architectures.

The client computing platform 104 is configured by machine-readable instructions 106. Machine-readable instructions 106 may include one or more instruction modules. The instruction modules may include computer program modules. The instruction modules may include one or more of a key handling module 110, an operation performance module 114, a database management module 116, and/or other instruction modules.

The server 102 is configured by machine-readable instructions 166. Machine-readable instructions 166 may include one or more instruction modules. The instruction modules may include computer program modules. The instruction modules may include one or more of a copy computing module 118, a username assignment module 124 and a database management module 126.

The key handling module 110 is configured to generate the master key 440, a basic key 400 and a basic recovery key 420. Generating the basic recovery key 420 may be performed, for instance, from a recovery string using a deterministic process. The operation performance module 114 is configured to perform a Shamir-type operation for obtaining n parts. Performing the Shamir-type operation may involve performing the Shamir-type operation on the basic recovery key itself or on the recovery string if used. m parts are required to recover the basic recovery key with m<n. The operation performance module 114 is also configured to use a network interface module 128 in the distribution of m or more of the n parts in the system 100 or outside thereof. Each one of the m or more parts are distributed to one party from a plurality of parties (e.g., users of the system 100, other parties in the system 100 and/or outside thereof). Distributing the m or more of the n parts each to one party from the plurality of parties may be performed by distributing each of the m or more parts to one and only one party of the plurality of parties.

The database management module 116 is configured to encrypt, using the basic key 400 the basic portion 320 of the database 300. As can be seen, the database 300 is remote from the client computing platform 104 and the database management module 116 is therefore configured to use the network interface module 128 when managing the database 300 on the server 102. The database management module 116 is also configured to encrypt, using the basic recovery key 420 the master key 440 for storage into the recovery portion 340 of the database 300. As can be appreciated, the basic portion 320 of the database 300 is uncompromised by recovery of the basic recovery key 420 and any private information 460 that the user decides not to store elsewhere will remain unavailable when the recovery key 420 is recovered because the basic portion 320 is encrypted using the basic key 400.

The optional copy computing module 118 may be configured to, upon reception of m or more parts from m or more parties from the plurality of parties, compute a copy of the basic recovery key 400'. When the Shamir-type operation is performed on the recovery key 420 itself, the copy computing module 118 is then able to directly generate the copy of the basic recovery key 400' from the received m of more parts. When the Shamir-type operation is performed on information (e.g., recovery string) used for yielding the recovery key 400, then the copy computing module 118 may be configured to, upon reception of m or more parts from m or more of the plurality of parties, compute a copy of the recovery string and, at least from the copy of the recovery string, generate the copy of the basic recovery key 400' using the deterministic process (i.e., yielding identical results as the one used by the operation performance module 114 from the same information).

When the database 300 also comprises the additional secured content 360, the copy computing module 118 may then be configured to, upon reception of m or more parts from m or more parties from the plurality of parties, compute a copy of the basic recovery key 400' for recovering content stored encrypted therein.

In the depicted example, the server 102 is shown as comprising the copy computing module 118. In other instances, another computer controlled by the third party (not shown) may comprise the copy computing module 118 as long as the database 300 may be ultimately accessed.

The database management module 126 may be configured to decrypt, using the copy of the basic recovery key 400', the master key 440 for the third party (e.g., in the system 100 or remote therefrom) from the recovery portion 420 of the database 300. As can be appreciated, the basic portion 320 of the database 300 may be uncompromised when the recovery portion 340 of the database 300 is decrypted by the database management module 126.

In implementations where a recovery string is necessitated by the operation performance module 114, the recovery string is generated and/or provided by and/or to the user. Typically, a Graphical User Interface (GUI) module 122 may be configured to, prior to generating the basic recovery key 400, obtain the recovery string from the user. The recovery string may also be generated at the client computing platform 104 (e.g., by the operation performance module 114).

The server 102 may comprise a username assignment module 124 configured to assign a username to the user. The username is typically unique within a domain of users for the organization including the user. The GUI module 122 may also be configured to obtain a secret string associated to the user. Generating the basic key 400 may, in some implementations, be performed by the key handling module 110 from at least the secret string and the username. Generating the master key 440 may also comprise generating the master key 440 as a content key from a random number. The database management module 116 may store content encrypted using the content key into the secured content portion 360 of the database 300.

The database management module 126 of the server 102 may be configured to create the database 300 for the user. However, it is to be understood that the basic key 400 is under control of the client computing platform 104 and not to be compromised with the server 102. As skilled people will readily understand the database management module 126 would create other databases (e.g., 300.a . . . b) for each of the required users, e.g., in an organization.

The database management module 126, at the server 102, may be configured to decrypt, using the copy of the basic recovery key 420', the secured information (i.e., at least the master key 440) for the third party from the recovery portion 340 of the database 300. As mentioned previously, the basic portion 320 of the database 300 is uncompromised when the recovery portion 340 of the database 300 is decrypted. The database management module 126, at the server 102, may be configured to decrypt, using the master key 440, content 540, 540' from the secured portion 360 of the database 300 and providing the decrypted content (e.g., in the organization). In some implementations, the master key 400 may be a content key for gaining access to a message content from a secured communication. In some implementations, the content key may be provided to the third party member of an organization that was not an original correspondent to the secured communication.

In some implementations, server(s) 102, client computing platform(s) 104, and/or external resources 134 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 134 may be operatively linked via some other communication media.

A given client computing platform 104 may include one or more processors 138 configured to execute computer program modules. The client computing platform 104 may also include electronic storage 136. The computer program modules may be configured to enable an expert or user associated with the given client computing platform 104 to interface with system 100 and/or external resources 134, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms. The client computing platform 104, e.g., through the network interface module 128, may include communication lines, or ports to enable the exchange of information with a network and/or other computing platforms. Illustration of the client computing platform 104 in FIG. 1 is not intended to be limiting. The client computing platform may include a plurality of hardware, software, and/or firmware components operating together to provide the functionality attributed thereto herein. For example, the client computing platform 104 may be partly by a cloud of computing platforms (not shown) operating together therewith.

External resources 134 may include sources of information outside of system 100, external entities participating with system 100, and/or other resources. In some implementations, some or all of the functionality attributed herein to external resources 134 may be provided by resources included in system 100.

Server(s) 102 may include electronic storage 140, one or more processors 142, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 136 and/or 140 may comprise non-transitory storage media that electronically stores information. The electronic storage media of electronic storage 136 and/or 140 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 136 and/or 140 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 136 and/or 140 may include one or more virtual storage resources (e.g., cloud storage, a virtual private network, and/or other virtual storage resources). Electronic storage 136 and/or 140 may store software algorithms, information determined by processor(s) respectively 138 and/or 142, information exchanged between the client computing platform(s) 104 and the server(s) 102, and/or other information that enables the client computing platform(s) 104 and the server(s) 102 to function as described herein.

Processor(s) 138/142 may be configured to provide information processing capabilities in the client computing platform 104/the server(s) 102. As such, processor(s) 138/142 may include one or more of a digital processor, an analog processor, a digital circuit designed to process information, an analog circuit designed to process information, a state machine, and/or other mechanisms for electronically processing information. Although processor(s) 138/142 is shown in FIG. 1 as a single entity, this is for illustrative purposes only. In some implementations, processor(s) 138/142 may include a plurality of processing units. These processing units may be physically located within the same device, or processor(s) 138/142 may represent processing functionality of a plurality of devices operating in coordination.

Processor(s) 138 are configured to execute modules 110, 114, 116, 122 and/or 128, and/or other modules. Processor(s) 138 may be configured to execute modules 110, 114, 116, 122, and/or 128, and/or other modules by software; hardware; firmware; some combination of software, hardware, and/or firmware; and/or other mechanisms for configuring processing capabilities on processor(s) 138.

Processor(s) 142 are configured to execute modules 118, 124 and/or 126, and/or other modules. Processor(s) 142 may be configured to execute modules 118, 124 and/or 126, and/or other modules by software; hardware; firmware; some combination of software, hardware, and/or firmware; and/or other mechanisms for configuring processing capabilities on processor(s) 142.

As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 110, 114, 116, 118, 122, 124, 126, and/or 128 are illustrated in FIG. 1 as being implemented within a single processing unit, in implementations in which processor(s) 138/142 includes multiple processing units, one or more of modules 110, 114, 116, 118, 122, 124, 126, and/or 128 may be implemented remotely from the other modules. The description of the functionality provided by the different modules 110, 114, 116, 118, 122, 124, 126, and/or 128 described below is for illustrative purposes, and is not intended to be limiting, as any of modules 110, 114, 116, 118, 122, 124, 126, and/or 128 may provide more or less functionality than is described. For example, one or more of modules 110, 114, 116, 118, 122, 124, 126, and/or 128 may be eliminated, and some or all of its functionality may be provided by other ones of modules 110, 114, 116, 118, 122, 124, 126, and/or 128. As another example, processor(s) 138/142 may be configured to execute one or more additional modules that may perform some or all of the functionality attributed below to one of modules 110, 114, 116, 118, 122, 124, 126, and/or 128.

FIGS. 4 and 5 illustrate methods 400 and 500 for gaining access to a secured information (e.g., a master key and/or additional secured content), in accordance with one or more implementations. The operations of methods 400 and 500 presented below are intended to be illustrative. In some implementations, methods 400 and 500 may be accomplished with one or more additional operations not described, and/or without one or more of the operations discussed. Additionally, the order in which the operations of method 400 and 500 are illustrated in FIG. 4 and described below is not intended to be limiting.

In some implementations, methods 400 and 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of methods 400 and 500.

FIG. 4 illustrates method 400, in accordance with one or more implementations. An operation 402 includes, at one of the user devices, generating the master key. An operation 404 includes, at one of the user devices, generating a basic key. An operation 406 includes, at one of the user devices, generating a basic recovery key. Operations 402, 404 and 406 are performed by one or more hardware processors configured by machine-readable instructions including a module that is the same as or similar to key management module 110, in accordance with one or more implementations.

An operation 408 includes at one of the user devices, performing a Shamir-type operation for obtaining n parts. m parts are required to recover the basic recovery key with m<n. the operation 408 also comprises distributing m or more of the n parts, each to one party from a plurality of parties. Operation 408 may be performed by one or more hardware processors configured by machine-readable instructions including a module that is the same as or similar to operation performance module 114, in accordance with one or more implementations.

An operation 410 includes, at one of the user devices, encrypting, using the basic key the basic portion of the database, the database being remote from the user devices. An operation 412 may include at one of the user devices, encrypting, using the basic recovery key the master key for storage into the recovery portion of the database, the database being remote from the user devices and the basic portion of the database being uncompromised by recovery of the basic recovery key. Operations 410 and 412 may be performed by one or more hardware processors configured by machine-readable instructions including a module that is the same as or similar to database management module 116, in accordance with one or more implementations.

FIG. 5 illustrates method 500 exemplarily implemented in an organization comprising a plurality of users in accordance with one or more implementations. In the example of FIG. 5, an operation 502 includes, at a server of the organization, assigning a username to the user. The username may be unique within a domain of users for the organization including the user. Operation 524 may be performed by one or more hardware processors configured by machine-readable instructions including a module that is the same as or similar to the username assignment module 124, in accordance with one or more implementations.

An operation 504 may include obtaining a secret string associated to the user. Operation 504 may be performed by one or more hardware processors configured by machine-readable instructions including a module that is the same as or similar to the GUI module 122 of a device controller by the user, in accordance with one or more implementations.

An operation 506 includes generating, at the device controller by the user, a message content key from the username and the secret string in additional to, optionally, a random number. The operation 506 may also comprise generating, at the device controller by the user, a basic key. The operation 506 may be performed by one or more hardware processors configured by machine-readable instructions including a module that is the same as or similar to key handling module 106 of the device controller by the user, in accordance with one or more implementations.

An operation 508 includes generating/receiving, at the device controller by the user, a recovery string. The operation 508 may be performed by one or more hardware processors configured by machine-readable instructions including a module that is the same as or similar to the GUI module 122 of the device controller by the user, in accordance with one or more implementations.

Operations 510 and 512 include performing a Shamir-type operation, at the device controller by the user, for generating 510 n parts and distributing 512 at least m of the n parts to selected users of the organization (e.g., a group of super users). The operations 510 and 512 may be performed by one or more hardware processors configured by machine-readable instructions including a module that is the same as or similar to the operation performance module 114 and the network interface module 128 of the device controller by the user, in accordance with one or more implementations.

An operation 514 may include, at the server of the organization, creating the database for the user, the database further including a secured content portion. Operation 514 may be performed by one or more hardware processors configured by machine-readable instructions including a module that is the same as or similar to the database management module 126, in accordance with one or more implementations.

An operation 516 includes, at the device controlled by the user, encrypt, using the basic key, the message content key and a private signature key for the user for storage into the basic portion of the database. An operation 518 includes, at the device controlled by the user, encrypt, using the recovery key, the message content key for the user for storage into the recovery portion of the database. An operation 520 includes, at the device controlled by the user, encrypt, using the message content key, message content for the user for storage into the secured content portion of the database. The operations 516, 518 and 520 may be performed by one or more hardware processors configured by machine-readable instructions including a module that is the same as or similar to the database management module 116 of the device controller by the user, in accordance with one or more implementations.

An operation 522 includes, at the server controlled by the organization, upon reception of m or more parts from m or more selected users from the plurality of users, computing a copy of the recovery string and computing, from the recovery string, a copy of the recovery key. Operation 522 may be performed by one or more hardware processors configured by machine-readable instructions including a module that is the same as or similar to the copy computing module 118 of the server controlled by the organization, in accordance with one or more implementations.

An operation 524 includes decrypting, using the copy of the recovery key, the message content key from the recovery portion of the database and decrypting, using the message content key, the message content from the secured content portion of the database. Operation 524 may be performed by one or more hardware processors configured by machine-readable instructions including modules that are the same as or similar to the copy computing module 118 and the database management module 126, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The present technology is not affected by the way the different modules exchange information between them. For instance, the memory module and the processor module could be connected by a parallel bus, but could also be connected by a serial connection or involve an intermediate module (not shown) without affecting the teachings of the present invention.

Various network links may be implicitly or explicitly used in the context of the present invention. While a link may be depicted as a wireless link, it could also be embodied as a wired link using a coaxial cable, an optical fiber, a category 6 cable, and the like. A wired or wireless access point (not shown) may be present on the link between. Likewise, any number of routers (not shown) may be present and part of the link, which may further pass through the Internet.

The present invention is not affected by the way the different modules exchange information between them. For instance, the memory module and the processor module could be connected by a parallel bus, but could also be connected by a serial connection or involve an intermediate module (not shown) without affecting the teachings of the present invention.

A method is generally conceived to be a self-consistent sequence of steps leading to a desired result. These steps require physical manipulations of physical quantities. Usually, though not necessarily, these quantities take the form of electrical or magnetic/electromagnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses. For instance, the splitting of the recovery string into a defined numbers of parts distributed to different members of a group of identified supers users may be adapted to randomly select the constitution of the group of super users from anyone in the organization or from a wider group of users having certain characteristics (e.g., hierarchical role in the organization, formal or informal training or academic background on selected topics, distance (physical or functional) from the user to be recovered, etc.). Likewise, the recovery mechanism could be adapted to an individual level wherein an individual could decide to apply a Shamir-type scheme to their own account (which does not necessarily have to be related to the previously discussed organization-based scenario). For example, critical information to recover secret data in the account could be split into 3 pieces, e.g., one being a piece of paper or hardware token, another provided to a manager or IT person, and the last being provided to the individual's own email. A piece could also be provided, in addition, or alternatively to the previous examples, to the individual's Dropbox account (e.g., particularly useful outside of an organizational context, i.e., when no manager or IT person is available) and/or to a friend's email. In such an embodiment, "self-recovery" could be provided with different pieces of information spread between online and offline.

What is claimed is:

1. A computing platform enabling selective access to secured information, the computing platform comprising at least one user device comprising:
   a non-transient computer-readable storage medium having executable instructions embodied thereon; and
   one or more hardware processors configured to execute the instructions to:
   generate the master key, the master key forming at least a part of the secured information;
   generate a basic key;
   obtain a recovery string for the user;
   from at least the recovery string, generate a basic recovery key using a deterministic process;
   perform a Shamir's secret sharing operation for obtaining n parts, wherein m parts are required to recover the basic recovery key with m<n, the Shamir's secret sharing operation being performed on the recovery string;
   distribute m or more of the n parts each to one party from a plurality of parties;
   encrypt, using the basic key the basic portion of the database, the database being remote from the user devices; and
   encrypt, using the basic recovery key the master key for storage into the recovery portion of the database, the database being remote from the user devices and the basic portion of the database being uncompromised by recovery of the basic recovery key.

2. The computing platform of claim 1, wherein the one or more hardware processors are configured to execute the instructions, when distributing the m or more of the n parts each to one party from the plurality of parties, to distribute each of the m or more parts to one and only one party of the plurality of parties.

3. The computing platform of claim 1, wherein the one or more hardware processors are configured to execute the instructions, when performing the Shamir's secret sharing operation, to perform the Shamir's secret sharing operation on the basic recovery key itself.

4. The computing platform of claim 3, further comprising at least one server comprising:
   a server-side non-transient computer-readable storage medium having executable instructions embodied thereon;
   the database for the user;
   one or more hardware processors configured by the instructions to:
   upon reception of m or more parts from m or more parties from the plurality of parties, compute a copy of the basic recovery key;
   decrypt, using the copy of the basic recovery key, the master key for the third party from the recovery portion of the database, wherein the basic portion of the database is uncompromised when the recovery portion of the database is decrypted.

5. The computing platform claim 1, further comprising at least one server comprising:
   a server-side non-transient computer-readable storage medium having executable instructions embodied thereon;
   the database for the user;

one or more hardware processors configured by the instructions to:
upon reception of m or more parts from m or more of the plurality of parties, compute a copy of the recovery string;
from the copy of the recovery string, generate a copy of the basic recovery key from at least the copy of the recovery string using the deterministic process; and
decrypt, using the copy of the basic recovery key, the master key from the recovery portion of the database, wherein the basic portion of the database is uncompromised when the recovery portion of the database is decrypted.

6. The computing platform of claim 1, wherein the master key is a content key for gaining access to a message content from a secured communication, wherein the content key is provided to a third party member of an organization that was not an original correspondent to the secured communication, the computing platform further comprising at least one server comprising:
a server-side non-transient computer-readable storage medium having executable instructions embodied thereon;
the database for the user;
one or more hardware processors configured by the instructions to:
assign a username to the user, the username being unique within a domain of users for the organization comprising the user;
create the database for the user, the database further comprising a secured content portion;
upon reception of m or more parts from m or more parties from the plurality of parties; compute a copy of the basic recovery key for recovering content stored encrypted in the secured content portion of the database;
decrypt, using the copy of the basic recovery key the content for the third party from the recovery portion of the database, wherein the basic portion of the database is uncompromised when the recovery portion of the database is decrypted; and
decrypt the content from the secured portion of the database and providing the decrypted message content in the organization; wherein generating the basic key is performed, at the user device, from at least the secret string and the username and
wherein generating the master key is performed, at the user device, by generating the content key from a random number, the user devices, further storing content encrypted using the content key into the secured content portion of the database.

7. A method, the method comprising:
at one of the user devices, generating the master key;
at one of the user devices, generating a basic key;
at one of the user devices, obtaining a recovery string for the user;
at one of the user devices, from at least the recovery, string generating a basic recovery key using a deterministic process;
at one of the user devices, performing a Shamir's secret sharing operation for obtaining n parts, wherein m parts are required to recover the basic recovery key with m<n, the Shamir's secret sharing operation being performed on the recovery string;
from one of the user devices, distributing m or more of the n parts each to one party from a plurality of parties;
at one of the user devices, encrypting, using the basic key the basic portion of the database, the database being remote from the user devices; and—at one of the user devices, encrypting, using the basic recovery key the master key for storage into the recovery portion of the database, the database being remote from the user devices and the basic portion of the database being uncompromised by recovery of the basic recovery key.

8. The method of claim 7, wherein distributing the m or more of the n parts each to one party from the plurality of parties is performed by distributing each of the m or more parts to one and only one party of the plurality of parties.

9. The method of claim 7, wherein performing the Shamir's secret sharing operation involves performing the Shamir's secret sharing operation on the basic recovery key itself.

10. The method of claim 9, further comprising:—upon reception of m or more parts from m or more parties from the plurality of parties, computing a copy of the basic recovery key at the computer controlled by the third party; and—decrypting, using the copy of the basic recovery key, the master key for the third party from the recovery portion of the database, wherein the basic portion of the database is uncompromised when the recovery portion of the database is decrypted.

11. The method of claim 7, further comprising:
upon reception of m or more parts from m or more of the plurality of parties, computing a copy of the recovery string at a computer controlled by the third party; from the copy of the recovery string, generating a copy of the basic recovery key at the computer controlled by the third party from at least the copy of the recovery string using the deterministic process; and
decrypting, using the copy of the basic recovery key, the master key for the third party from the recovery portion of the database, wherein the basic portion of the database is uncompromised when the recovery portion of the database is decrypted.

12. The method of claim 7, wherein the master key is a content key for gaining access to a message content from a secured communication, wherein the content key is provided to the third party member of an organization that was not an original correspondent to the secured communication, the method comprising:
at a server of the organization, assigning a username to the user, the username being unique within a domain of users for the organization comprising the user;
at the server of the organization, creating the database for the user, the database further comprising a secured content portion;
obtaining a secret string associated to the user, wherein generating the basic key is performed, at one of the user devices, from at least the secret string and the username and wherein generating the master key is performed, at one of the user devices, by generating the content key from a random number;
from one of the user devices, storing content encrypted using the content key into the secured content portion of the database;
upon reception of m or more parts from m or more parties from the plurality of parties, computing a copy of the basic recovery key at the server of the organization for recovering content stored encrypted in the secured content portion of the database;
decrypting, using the copy of the basic recovery key the content for the third party from the recovery portion of the database, wherein the basic portion of the database is uncompromised when the recovery portion of the database is decrypted; and at a server of the organization, decrypting the content from the secured portion of the database and providing the decrypted message content in the organization.

13. A system, the system comprising:

a user device comprising one or more hardware processors configured by machine-readable instructions to:
generate the master key;
generate a basic key;
obtain a recovery string for the user;
from at least the recovery string, generate a basic recovery key using a deterministic process;
perform a Shamir's secret sharing operation for obtaining n parts, wherein m parts are required to recover the basic recovery key with m<n, the Shamir's secret sharing operation being performed on the recovery string;
from one of the user devices, distributing m or more of the n parts each to one party from a plurality of parties;
encrypt, using the basic key the basic portion of the database, the database being remote from the user devices; and
encrypt, using the basic recovery key the master key for storage into the recovery portion of the database, the database being remote from the user devices and the basic portion of the database being uncompromised by recovery of the basic recovery key.

14. The system of claim 13, wherein distributing the m or more of the n parts each to one party from the plurality of parties is performed by distributing each of the m or more parts to one and only one party of the plurality of parties.

15. The system of claim 13, wherein performing the Shamir's secret sharing operation involves performing the Shamir's secret sharing operation on the basic recovery key itself.

16. The system of claim 15, further comprising a server configured by machine-readable instructions to:
upon reception of m or more parts from m or more parties from the plurality of parties, compute a copy of the basic recovery key at the computer controlled by the third party;
decrypt, using the copy of the basic recovery key, the master key for the third party from the recovery portion of the database, wherein the basic portion of the database is uncompromised when the recovery portion of the database is decrypted.

17. The system of claim 13, further comprising a server configured by machine-readable instructions to:
upon reception of m or more parts from m or more of the plurality of parties, compute a copy of the recovery string at a computer controlled by the third party, from the copy of the recovery string, generating a copy of the basic recovery key at the computer controlled by the third party from at least the—copy of the recovery string using the deterministic process; and
decrypt, using the copy of the basic recovery key, the master key for the third party from the recovery portion of the database, wherein the basic portion of the database is uncompromised when the recovery portion of the database is decrypted.

18. The system of claim 13, wherein the master key is a content key for gaining access to a message content from a secured communication, wherein the content key is provided to a third party member of an organization that was not an original correspondent to the secured communication;
wherein the system further comprise a server configured by machine-readable instructions to:
assign a username to the user, the username being unique within a domain of users for the organization comprising the user;
create the database for the user, the database further comprising a secured content portion;
upon reception of m or more parts from m or more parties from the plurality of parties, compute a copy of the basic recovery key at the server of the organization for recovering content stored encrypted in the secured content portion of the database;
decrypt, using the copy of the basic recovery key the content for the third party from the recovery portion of the database, wherein the basic portion of the database is uncompromised when the recovery portion of the database is decrypted; and
decrypt the content from the secured portion of the database and provide the decrypted message content in the organization, obtain a secret string associated to the user, wherein generating the basic key is performed from at least the secret string and the username and
wherein generating the master key is performed by generating the content key from a random number, the user device further storing content encrypted using the content key into the secured content portion of the database.

19. A non-transient computer-readable storage medium having instructions embodied thereon, the instructions being executable by one or more processors to perform a method, the method comprising:
at one of the user devices, generating the master key;
at one of the user devices, generating a basic key;
at one of the user devices, obtaining a recovery string for the user;
at one of the user devices, from at least the recovery, string generating a basic recovery key using a deterministic process;
at one of the user devices, performing a Shamir's secret sharing operation for obtaining n parts, wherein m parts are required to recover the basic recovery key with m<n, the Shamir's secret sharing operation being performed on the recovery string;
from one of the user devices, distributing m or more of the n parts each to one party from a plurality of parties;
at one of the user devices, encrypting, using the basic key the basic portion of the database, the database being remote from the user devices; and
at one of the user devices, encrypting, using the basic recovery key the master key for storage into the recovery portion of the database, the database being remote from the user devices and the basic portion of the database being uncompromised by recovery of the basic recovery key.

20. The computer-readable storage medium of claim 19, wherein distributing the m or more of the n parts each to one party from the plurality of parties is performed by distributing each of the m or more parts to one and only one party of the plurality of parties.

21. The computer-readable storage medium of claim 19, wherein performing the Shamir's secret sharing operation involves performing the Shamir's secret sharing operation on the basic recovery key itself.

22. The computer-readable storage medium of claim 21, wherein the method further comprises:
   upon reception of m or more parts from m or more parties from the plurality of parties, computing a copy of the basic recovery key at the computer controlled by the third party; and
   decrypting, using the copy of the basic recovery key, the master key for the third party from the recovery portion of the database, wherein the basic portion of the database is uncompromised when the recovery portion of the database is decrypted.

23. The computer-readable storage medium of claim 19, wherein the method further comprises:—upon reception of m or more parts from m or more of the plurality of parties, computing a copy of the recovery string at a computer controlled by the third party; from the copy of the recovery string, generating a copy of the basic recovery key at the computer controlled by the third party from at least the copy of the recovery string using the deterministic process; and—decrypting, using the copy of the basic recovery key, the master key for the third party from the recovery portion of the database, wherein the basic portion of the database is uncompromised when the recovery portion of the database is decrypted.

24. The computer-readable storage medium of claim 19, wherein the master key is a content key for gaining access to a message content from a secured communication, wherein the content key is provided to the third party member of an organization that was not an original correspondent to the secured communication, the method comprising:
   at a server of the organization, assigning a username to the user, the username being unique within a domain of users for the organization comprising the user;
   at the server of the organization, creating the database for the user, the database further comprises a secured content portion;
   obtaining a secret string associated to the user, wherein generating the basic key is performed, at one of the user devices, from at least the secret string and the username and wherein generating the master key is performed, at one of the user devices, by generating the content key from a random number;
   from one of the user devices, storing content encrypted using the content key into the secured content portion of the database;
   upon reception of m or more parts from m or more parties from the plurality of parties, computing a copy of the basic recovery key at the server of the organization for recovering content stored encrypted in the secured content portion of the database;
   decrypting, using the copy of the basic recovery key the content for the third party from the recovery portion of the database, wherein the basic portion of the database is uncompromised when the recovery portion of the database is decrypted; and
   at the server of the organization, decrypting the content from the secured portion of the database and providing the decrypted message content in the organization.

* * * * *